(12) United States Patent
Lotz et al.

(10) Patent No.: US 10,422,276 B2
(45) Date of Patent: Sep. 24, 2019

(54) METHOD OF CONTROLLING WASTEGATE FLOW USING PORT SIDE WALL CONTOUR

(71) Applicant: BorgWarner Inc., Auburn Hills, MI (US)

(72) Inventors: Robert Lotz, Arden, NC (US); Brian Handlon, Arden, NC (US); Jason Chekansky, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/933,623

(22) Filed: Mar. 23, 2018

(65) Prior Publication Data

US 2018/0209328 A1 Jul. 26, 2018

Related U.S. Application Data

(63) Continuation-in-part of application No. 15/026,621, filed as application No. PCT/US2014/059393 on Oct. 7, 2014, now Pat. No. 9,988,974.

(60) Provisional application No. 61/888,639, filed on Oct. 9, 2013.

(51) Int. Cl.
   *F02B 37/18* (2006.01)
   *F01D 17/10* (2006.01)
   *F16K 1/20* (2006.01)
   *F16K 1/42* (2006.01)

(52) U.S. Cl.
   CPC .......... *F02B 37/186* (2013.01); *F01D 17/105* (2013.01); *F16K 1/20* (2013.01); *F16K 1/42* (2013.01); *F05D 2220/40* (2013.01); *Y02T 10/144* (2013.01)

(58) Field of Classification Search
   CPC ...... F02B 37/18; F02B 37/183; F02B 37/186; F01D 17/105; F05D 2220/40
   USPC ........................................................... 60/602
   See application file for complete search history.

(56) References Cited

U.S. PATENT DOCUMENTS

| | | | | |
|---|---|---|---|---|
| 3,699,999 A | * | 10/1972 | Dunkelis | F16K 17/19 251/122 |
| 4,075,849 A | * | 2/1978 | Richardson | F02B 37/183 60/602 |
| 4,304,097 A | * | 12/1981 | Kondo | F02B 37/186 60/602 |
| 4,311,008 A | * | 1/1982 | Yamada | F02B 37/186 60/602 |

(Continued)

FOREIGN PATENT DOCUMENTS

NL 9001851 A * 3/1992 ........... F16K 15/063

*Primary Examiner* — Thai Ba Trieu
(74) *Attorney, Agent, or Firm* — Eric L. Doyle; Stephan A. Pendorf; Patent Central LLC

(57) ABSTRACT

A wastegate assembly with a valve head moved linearly toward and away from a wastegate port via a valve stem. When the valve is in an open position the valve seat face of the valve head is spaced apart from the valve seat. When the valve is in a closed position the valve seat face of the valve head is secured against the valve seat. The wastegate assembly includes a sidewall surrounding the wastegate port elongated in the direction of valve movement. The contoured side wall widens going away from the valve seat. The minimum flow area through the wastegate port is controlled such that the flow is choked via the side wall rather than the valve curtain area. The contoured side wall can be recessed into the housing or extend from the housing.

7 Claims, 6 Drawing Sheets

(56) References Cited

U.S. PATENT DOCUMENTS

| | | | | |
|---|---|---|---|---|
| 8,844,283 B2* | 9/2014 | Kuhlmeyer | ........... | F02B 37/183 60/602 |
| 2013/0263589 A1* | 10/2013 | Yamada | ................. | F02D 23/02 60/602 |
| 2015/0121863 A1* | 5/2015 | Micanek | ............... | F02B 37/183 60/605.1 |

\* cited by examiner

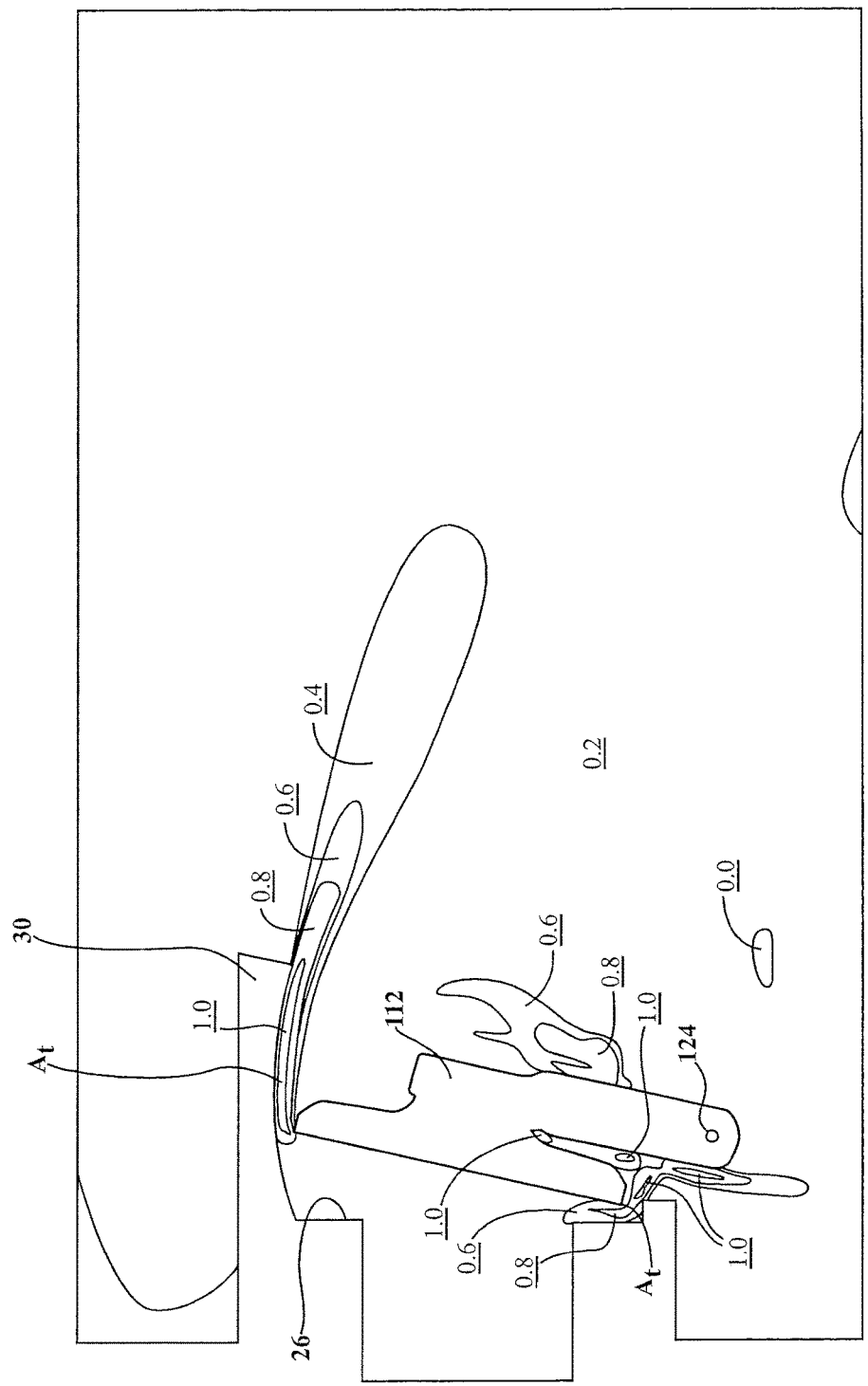

METHOD OF CONTROLLING WASTEGATE FLOW USING PORT SIDE WALL CONTOUR

BACKGROUND

Field of the Disclosure

This disclosure relates to a wastegate assembly having an actuator for controlling a wastegate valve adapted for use with turbochargers. More particularly, this disclosure relates to a contoured side wall that is radially offset from a port valve side adjacent to the wastegate port as part of the wastegate assembly.

Description of Related Art

Advantages of turbocharging include increased power output, lower fuel consumption and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor wheel that is mounted on the same shaft so that rotation of the turbine wheel causes rotation of the compressor wheel.

Turbochargers typically include a turbine housing connected to the engine's exhaust manifold, a compressor housing connected to the engine's intake manifold, and a center bearing housing coupling the turbine and compressor housings together. The turbine housing defines a volute that surrounds the turbine wheel and that receives exhaust gas from the engine. The turbine wheel in the turbine housing is rotatably driven by a controlled inflow of exhaust gas supplied from the exhaust manifold.

This disclosure focuses on a wastegate assembly disposed in the turbine housing of turbochargers. A wastegate assembly includes a valve, vent and/or bypass that is able to route a significant portion (an example being about 30 percent) of the exhaust gas around (i.e. bypassing) the turbocharger turbine, in order to limit/control turbine work, thus only selectively utilizing a fraction of the available exhaust energy when appropriate. The wastegate assembly by selectively allowing exhaust gas to bypass the turbine wheel reduces the turbocharger's output (or boost). Thereby, the wastegate assembly regulates exhaust gas flow and ensures that the turbine wheel is not spun at an undesirable speed.

Exhaust gas flow is regulated (i.e. some bypassing) though the turbine stage, in order to control turbine work, thus selectively using a fraction of the available exhaust energy. Decreasing the degree of opening of the wastegate valve reduces the amount of exhaust gas that is allowed to bypass the turbocharger turbine, which should increase the amount of pressurized air to the intake manifold. Additionally, or optionally, the engine controller may be configured to decrease the duration of opening of the wastegate valve. An actuator can adjust the amount of exhaust gas that bypasses the turbine through the wastegate assembly.

A turbocharger with a wastegate assembly often has a mechanical actuator for controlling the wastegate valve. The actuator may actively control flow channel geometry with flow control through the wastegate (bypass) port. The actuator of the wastegate assembly may include an arm assembly with a lever arm from a pivot point with a valve head on the lever arm's end that selectively covers a wastegate port. Similarly, the valve head may operate on an arm as a valve rod of a poppet valve or similar non-pivoting valve.

Exhaust gas flow through a wastegate valve actuated via a pivotable lever arm is typically choked, i.e. flow is controlled by the valve curtain area (flow throat area). It is often desirable to use a short lever arm to reduce hinge movement (and packaging constraints). This results in very large and non-linear changes to the curtain area (and resulting flow) with small actuation angles.

Referring to FIG. 1, a conventional turbocharger includes a turbine housing 100 having a wastegate assembly 112 in communication with the volute passage 118 in the turbine housing 100. The turbine housing 100 has a wastegate port 114 that allows exhaust gas flow to bypass the turbine wheel. A wastegate assembly 112 is used to control exhaust gas flow through the wastegate port 114. The wastegate assembly 112 may include a valve 116 that is moveable with respect to the wastegate port 114 for blocking and unblocking the wastegate port 114 thereby controlling the exhaust gas flow, wherein some exhaust gas flow can bypass the turbine wheel to control turbine work in that the turbine wheel rotates at controlled speeds, and thus the maximum boost pressure provided by the compressor. The wastegate port 114 allows bypass gas flow via a valve curtain area $A_{vc}$. The flow through a wastegate valve 116 in the turbine housing 100 is choked throughout most of its operating range, i.e. the flow rate through the valve 116 is determined by the valve curtain area (flow throat area) $A_{vc}$. FIG. 5 includes the baseline flow rate for a conventional wastegate valve 116. On a pivoting valve such as wastegate valve 116 that is actuated by a lever arm 120 that pivots about a pivot point 124, an undesirable correlation can result between the actuation angle and the resulting flow rate. For example, the flow rate increases rapidly with actuator angle at small valve opening, but becomes increasingly insensitive to actuator angle the more the valve is opened. This is shown in FIG. 5 by an initially quick increase in mass flow at smaller valve opening angles, then a substantially flat line at the top right of the baseline conventional wastegate valve at a valve opening angle beginning at about 23 degrees, as an example.

Thus, there is a need for more gradual changes in the valve curtain area $A_{vc}$, and consequently finer control of valve opening and exhaust gas flow.

SUMMARY

This disclosure relates to a method of controlling wastegate flow by using port side wall contour with the wastegate assembly. More gradual changes in curtain area and more precise control can be accomplished by shaping the side wall near the valve such that the area controlling the flow is the throat area $A_t$ (e.g. the area between the valve and side wall), instead of the valve curtain area $A_{vc}$ (e.g., the area between the valve and the valve seat).

The current disclosure includes choking the flow in the throat area $A_t$ between the valve side and a specially contoured side wall, instead of the valve curtain area $A_{vc}$ as is done in the conventional wastegate valve. As long as the area between the sidewall and valve side is smaller than the curtain area, the flow will choke against the side wall instead of the valve curtain area.

The contoured side wall is constructed by a radial offset from the valve side corresponding to the desired flow area at a specific valve opening per FIG. 3. The area progression can be a designed shape to fit a specific mass flow versus actuator angle profile, but has to be smaller than the effective curtain area between valve and valve seat. The contoured side wall shape may have a concave portion adjacent to the distal end of the valve head that may be pivotably moved.

The side wall can also incorporate hole wells, such as channels, that allow fine tuning of mass flow versus actuator angle curve to suit specific requirements. Specific shapes of the hole well, such as lobes into the housing, extending from the wastegate port can direct exhaust gas flow. As such, it can further (1) allow precise control and (2) reduce interference with the main turbine exhaust flow. The precise control can be generally of the outlet area or in certain embodiments, balance between ports of a twin volute design or correspond with various additional channels.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 6B illustrates Mach number contours at an actuator angle of 12.6 degrees for contoured side wall valves as CSW_1 showing choke against the side wall.

DETAILED DESCRIPTION OF THE EMBODIMENTS

A turbocharger is generally known and includes a turbine and a compressor, wherein a compressor wheel is rotatably driven via a shaft by a turbine wheel. The rotatable shaft passes through a bearing housing disposed between a turbine housing 10 and a compressor housing. The turbine converts exhaust gas pressure into energy to drive the turbine wheel, which via the shaft drives the compressor wheel. While exhaust gas flow is used to drive the turbine wheel, often some exhaust gas flow may be allowed to bypass the turbine wheel to control turbine work.

Figure 1:
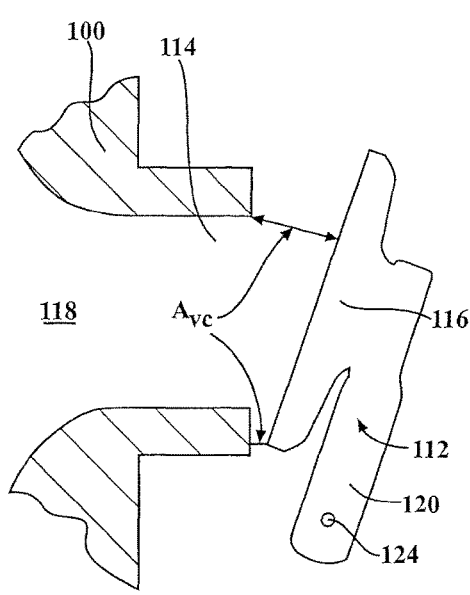
FIG. 1 is a side cross-sectional view of a prior art wastegate assembly in which flow is choked in a valve curtain area.
Figure 2:
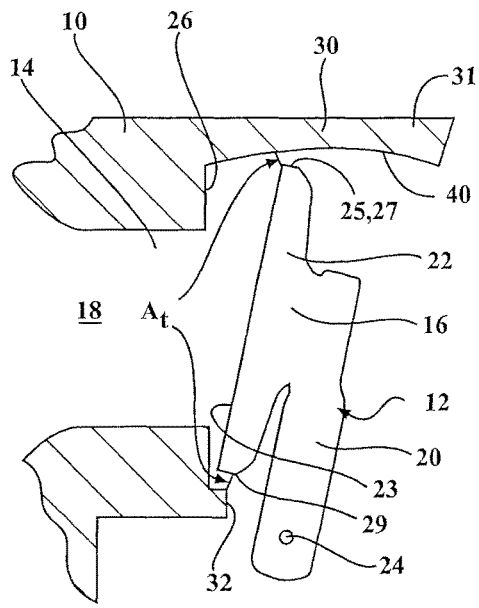
FIG. 2 is a side cross-sectional view of a wastegate assembly with a contoured side wall in which flow is choked in a valve throat between the valve side and a side wall area.

Referring to FIG. 2, the turbine housing 10 has a wastegate port 14 formed in a sidewall thereof and communicating with a turbine volute 18. The wastegate port 14 is configured to permit exhaust gas flow to exit the turbine volute 18 which is upstream of the turbine wheel, thereby bypassing the turbine wheel to the bypass channel of the turbine housing 10. A wastegate assembly 12 is provided on the turbine housing and is used to control exhaust gas flow through the wastegate port 14. The wastegate assembly 12 includes a wastegate valve 16 that is controlled by an actuator (not shown) to selectively block the wastegate port 14 to control exhaust gas flow out of the volute 18 through the wastegate port 14. The valve 16 is moveable with respect to the wastegate port 14 for blocking and unblocking the wastegate port 14, thereby controlling the exhaust gas flow, wherein some exhaust gas flow can bypass the turbine wheel to control turbine work in that the turbine wheel rotates at controlled speeds. The wastegate port 14 allows bypass gas flow in order to control the maximum boost pressure via the actuator 18.

The wastegate valve 16 includes an arm 20 connected to a valve head 22. The valve head 22 may have a peripheral edge (e.g., margin) 25 having a shape that corresponds to the shape of the wastegate port 14, and includes a seat face 23 corresponding to the planar valve surface that faces the wastegate port 14 and cooperates with a planar valve seat 26 surrounding the wastegate port 14 to form a seal. The valve 16 is connected to the actuator via the arm 20. The arm 20 is constructed and arranged to move the valve head 22 with respect to the wastegate port 14 to control the exhaust gas flow through the wastegate port 14. In the illustrated embodiment, the valve 16 is a pivot valve, and the actuator causes the arm 20 to pivot about a pivot point 24 at an end of the arm 20 opposed to the vale head 22 in order to open and close the valve 16, and thereby selectively allow exhaust gas flow to bypass the turbine wheel.

As shown, the arm 20 is relatively short to reduce hinge movement and to fit into a more compact space. The valve head 22 is moveable to at least a first position and a second position so that in the first position the seat face 23 is spaced apart from the valve seat 26, and the wastegate port 14 is fully open, and in the second position, the seat face 23 contacts the valve seat 26 and the wastegate port 14 is closed to preclude exhaust gas flow from flowing through the wastegate port 14. In the closed position, the valve head 22 is secured against the valve seat 26. The valve 16 is pivotable to intermediate positions between fully open and fully closed allow for precise control of exhaust gas through the wastegate port 14. The angle of the lever arm 20 relative to the valve seat 26 forms the actuator angle as the valve head 22 is pivoted relative to the wastegate port 14.

The wastegate assembly 12 includes the turbine housing having a contoured side wall 30 that surrounds the valve head margin 25 when the valve 16 is in the first position (e.g., an open position) to permit choking the flow from the wastegate port 14 between the valve head margin 25 and the side wall 30, e.g., in the throat area at. The sidewall 30 includes a longer wall portion 31 at a location corresponding to an outer end 27 (e.g., furthest from the pivot point 24) of the valve head 22, and a shorter wall portion 32 at a location corresponding to an inner end 29 (e.g., closest to the pivot point 24) of the valve head 22. The longer wall portion 31 and shorter wall portion 32 are sized and shaped to cooperate with the valve head 22 in various valve positions to form a desired throat area $A_t$, and thereby control the flow around the inner end of the valve head 22. The contoured side wall 30 is constructed by a radial offset $R_o$ from the valve head margin 25 and substantially forms a rim that is offset from and surrounds the wastegate port 14. A lip resulting from the offset forms the valve seat 26 around the wastegate port 14 that operably seals when in contact with the valve head 22. The longer wall portion 31 of the contoured side wall 30 is shown at the valve head outer end 27 with a substantially concave portion 40 adjacent to the valve head outer end 27.

Figure 3:
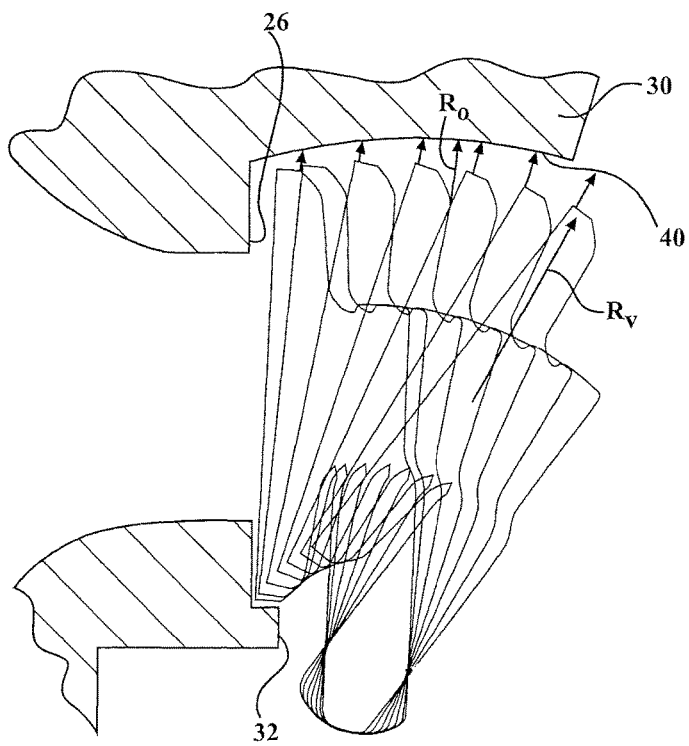
FIG. 3 illustrate a side wall shape relative to a valve head in various positions.

Referring to FIG. 3, the valve head 22 is moveable relative to the contoured sidewall 30 between various positions. The specific contour of the side wall 30 may correspond to the desired flow area at a specific valve opening angle. The area progression can take various shapes to fit the specific mass flow versus actuator angle profile, but it has to be smaller than the curtain area $A_{vc}$ between the valve 16 and the valve seat 26. As shown, an exemplary radial offset $R_o = \operatorname{sqrt}(Ae/\pi + Rv^2)$ for side wall construction, where Ae refers an effective area and Rv refers to a radius of the valve head 22. The angle of the concave portion 40 may allow the contoured side wall 30 to be closer to the margin 25 of the valve head 22 at a smaller valve opening angles, and correspondingly the contoured side wall 30 may be farther from the margin 25 of the valve head 22 at increased valve opening angles to help control flow.

Figure 4:
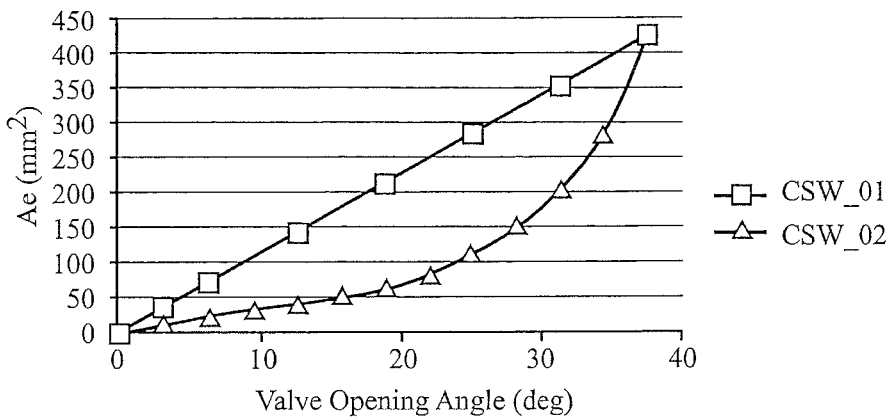
FIG. 4 is a graph of valve opening angle (degrees) versus area (mm$^2$) illustrating design effective area.

Referring to FIG. 4, two different exemplary contoured sidewall profiles were analyzed using computational fluid mechanics. The first profile CSW_01 corresponded to a simple linear flow rate versus actuator angle schedule, while the second profile CSW_02 was linear up to an opening angle of 12.6 degrees, and then exponential up to the maximum opening angle. FIG. 4 is a chart design flow area profile with design effective area at varying valve opening angles.

Figure 5:
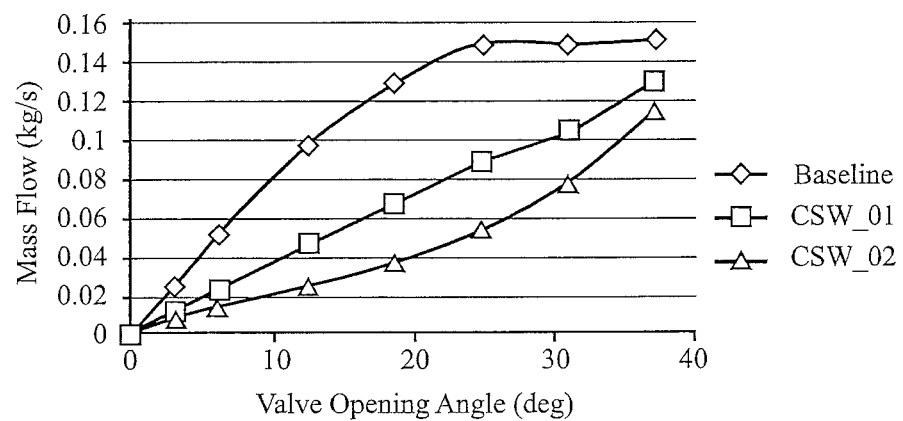
FIG. 5 is a graph of valve opening area (degrees) versus mass flow rate (kg/sec) illustrating a conventional wastegate valve as a baseline as compared with contoured sidewall assemblies.

Referring to FIG. 5, the mass flow rates were calculated for various opening angles in order to compare the mass flow rates of the conventional wastegate valve 112 having no sidewall contouring as the base line with the two exemplary sidewall profiles CSW_01 and CSW_02. Referring to the baseline flow rate for a conventional wastegate valve for a valve that is actuated by a pivoting lever arm, an undesirable correlation can result between the actuation angle and the resulting flow rate, i.e. flow rate increases rapidly with actuator angle at small valve opening angles, but becomes increasingly insensitive to actuator angle the more the valve is opened. A substantially flat line is shown as the insensitivity to the angle at the top right of the baseline conventional wastegate valve at a valve opening angle beginning at about 23 degrees.

The mass flow rate of the wastegate assemblies 12 with the contoured side walls 30 shows a more consistent (linear) mass flow rate increase as the valve opening angle increases. As shown as CSW_01 and CSW_02, this allows for more consistent and precise control of the bypass of exhaust gas. In a wastegate valve assembly 12 including contoured side walls 30, the flow increase corresponds more steadily and proportionately to the increased valve opening angle.

Figure 6A:
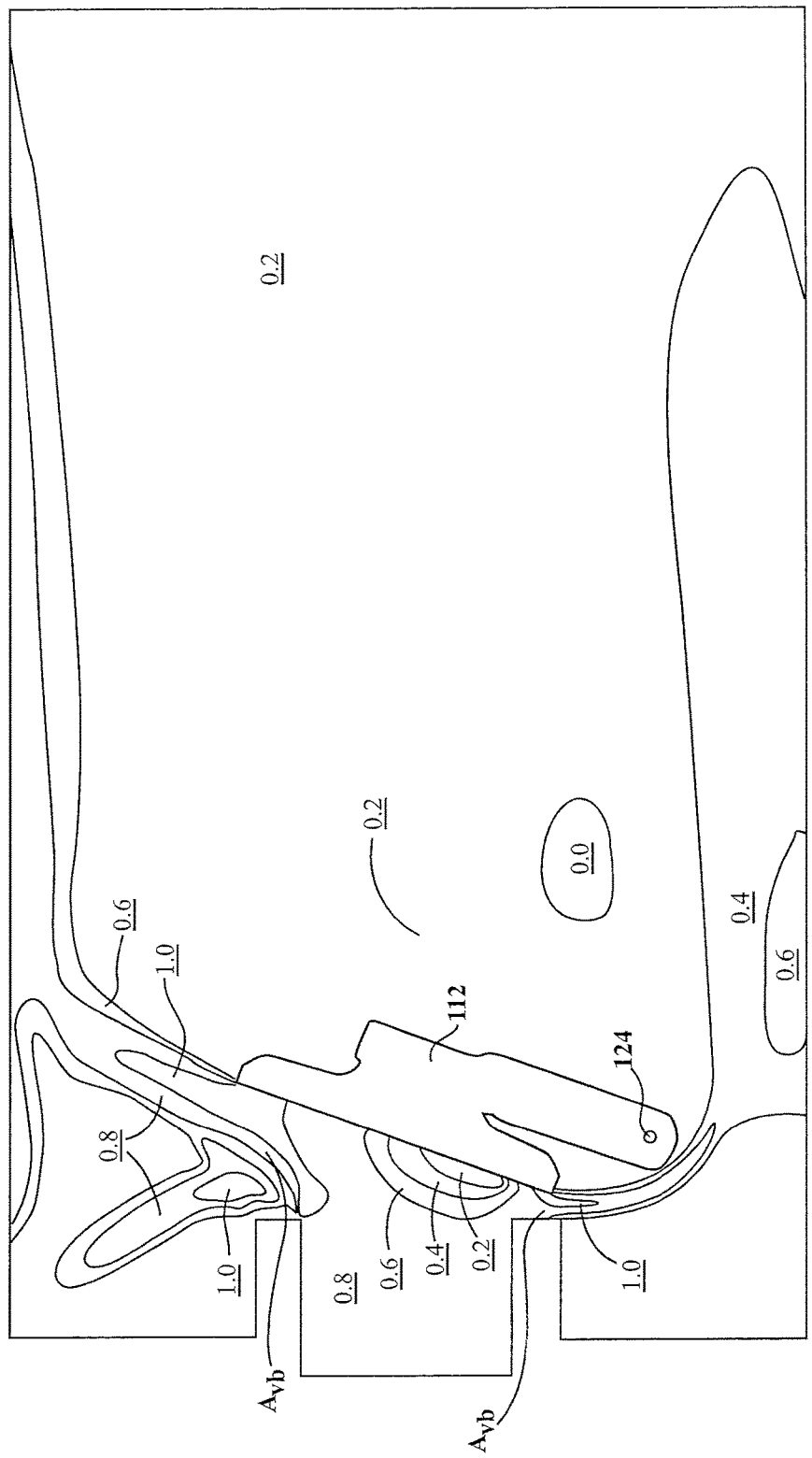
FIG. 6A illustrates Mach number contours at an actuator angle of 12.6 degrees for a conventional wastegate valve configuration showing choke in the valve curtain area.
Figure 6C:
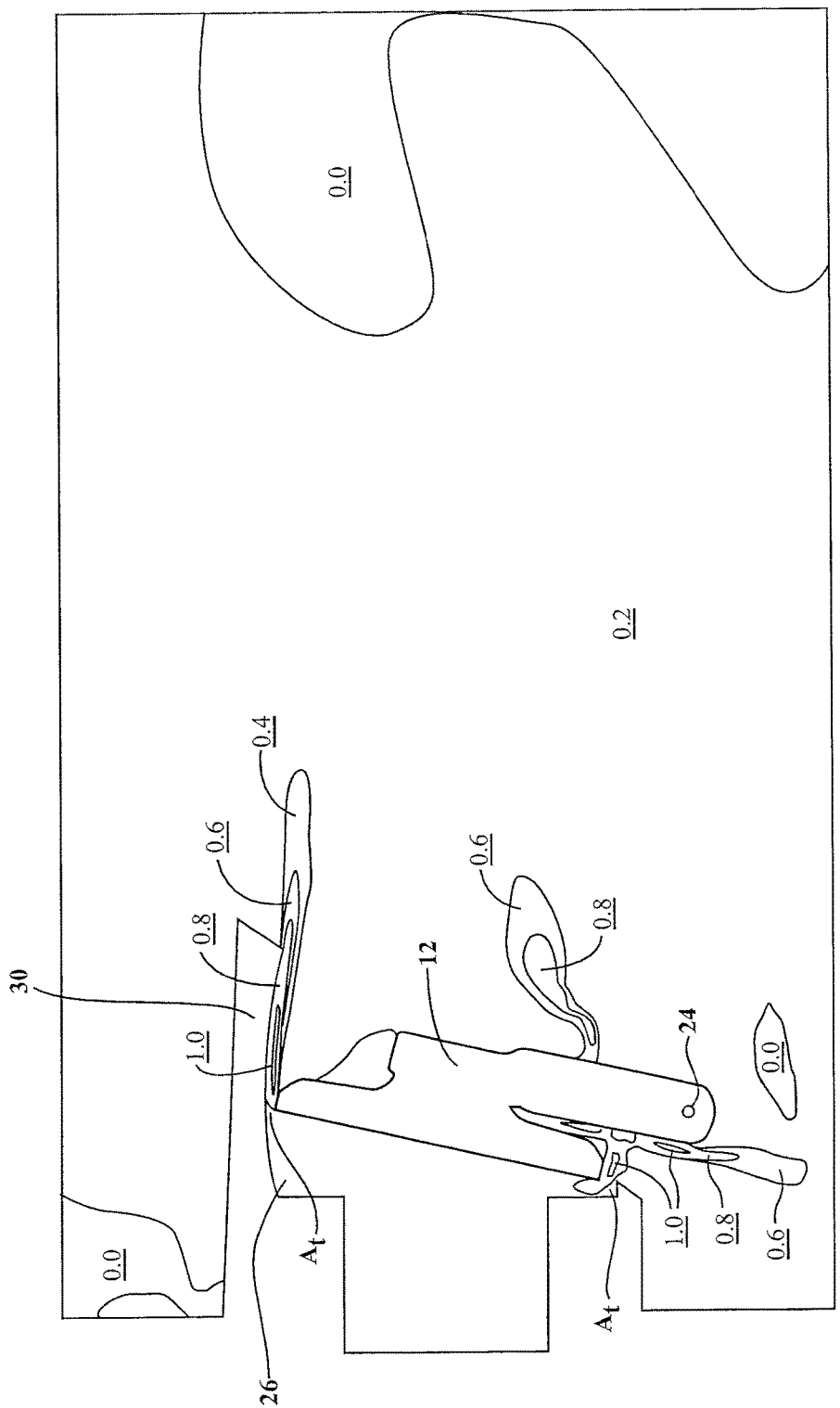
FIG. 6C illustrates Mach number contours at an actuator angle of 12.6 degrees for contoured side wall valves as CSW_2 showing choke against the side wall.

Referring to FIGS. 6A-6C, Mach contours were calculated for an actuator angle of 12.6 degrees for each of the test configurations in order to illustrate the location of choke for each configuration. As seen in FIG. 6A, for the conventional wastegate valve assembly 112 having no sidewall contouring, choke exists in the valve curtain area $A_{vc}$ between the valve seat face 23 and the valve seat 26. In contrast, as seen in FIGS. 6B and 6C, when the wastegate valve assembly 12 includes a contoured sidewall 30 such as defined by CSW_01 and CSW_02, choke exists in the throat area $A_t$ between the valve head margin 25 and the sidewall 30.

The contoured side wall 30 surrounding the valve head 22 controls wastegate flow with the port side wall contour of the wastegate assembly 12. More gradual changes in curtain area and more precise control can be accomplished by shaping the side wall 30 near the valve head 22 such that the throat area $A_t$ controlling the flow is between the valve head 22, particularly the valve head margin 25, and side wall 30, instead of the valve head 22, particularly the valve seat face 23, and the valve seat 26. Choking the flow between the valve head margin 25 and a specially contoured side wall 30 is ideal as long as the area between the side wall 30 and the valve head margin 25 is smaller than the valve curtain area $A_{vc}$, so the flow will choke against the side wall 30 instead of within the valve curtain area $A_{vc}$.

Figure 7:
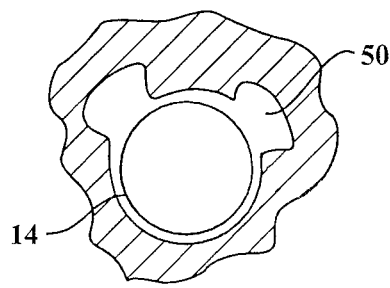
FIG. 7 shows a top cross-sectional view of a side wall incorporating hole wells.

As shown in FIG. 7, the contoured side wall 30 can also incorporate hole wells 50, i.e. channels, that allow fine tuning of mass flow versus actuator angle curve to suit specific requirements. Specific shapes of the hole wells 50, such as lobes into the turbine housing 10, can extend from or otherwise radiate from the wastegate port 14 to direct wastegate flow. By including hole wells 50 in the side wall 30, the wastegate assembly 12 can (1) provide increased precision in flow control and (2) reduce interference with the main turbine exhaust flow. The precise control with hole wells 50 can be generally of the outlet area or in certain embodiments, balance between ports of a twin volute design or correspond with additional channels for exhaust gas flow per specific designs.

Figure 9:
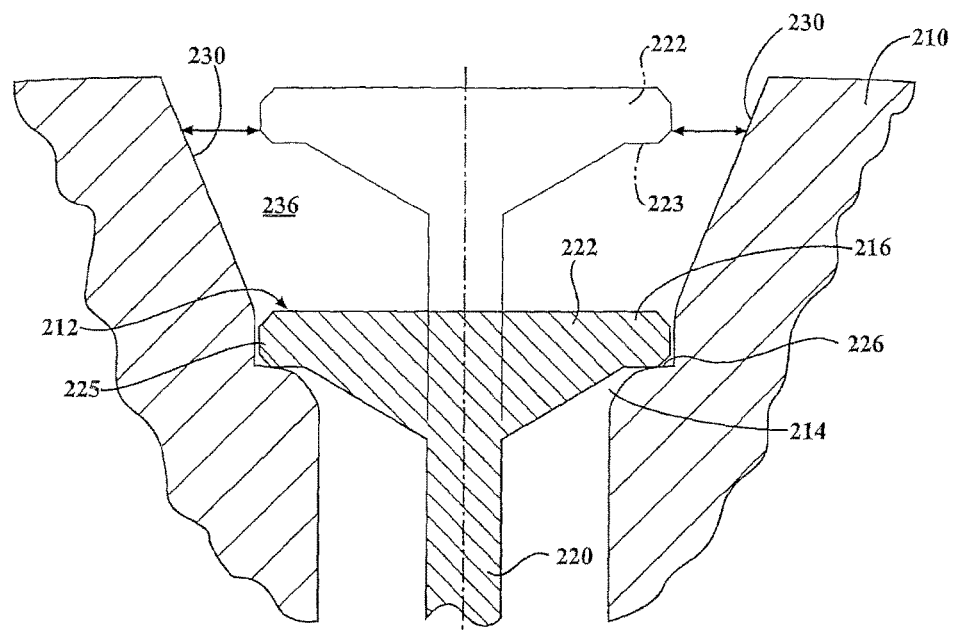
FIG. 9 is a partial cross-sectional view of wastegate assembly having a poppet valve with a contoured side wall with choking the flow in a valve to side wall area.
Figure 8:
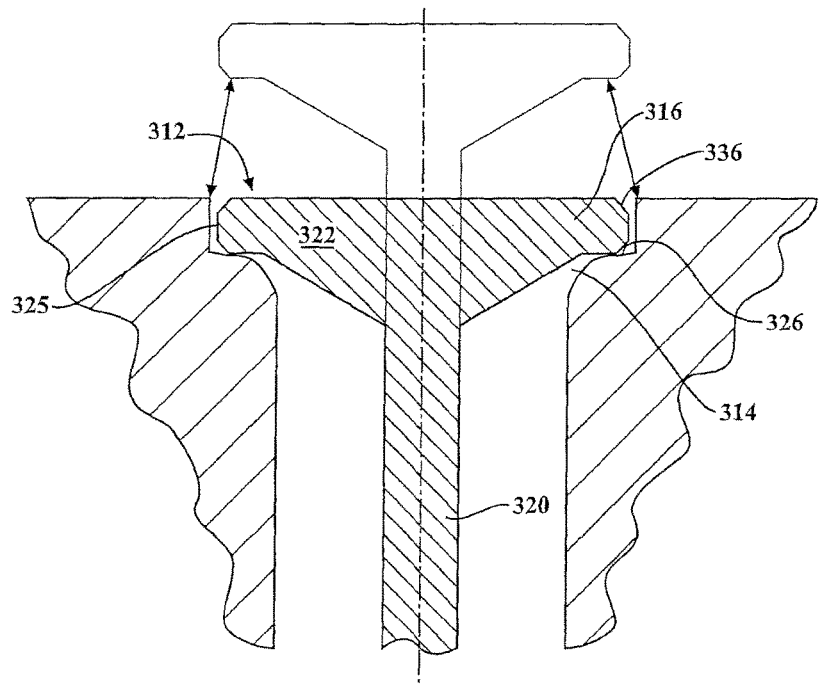
FIG. 8 is a depiction of a prior art wastegate assembly with a poppet valve with a curtain area between the valve and the housing.

Referring to FIGS. 8 and 9, although the wastegate assembly 12 has been described herein as including a pivot-type valve 16 that rotates about a pivot point 24 between open and closed positions, the wastegate assembly 12 is not limited to employing a pivot-type valve. It is understood that the wastegate assembly 12 may include other types of valves such as, for example, a poppet-type valve. In this example, a wastegate assembly 212 includes the poppet valve 216 having a valve head 222 supported on a valve stem 220. The valve head 222 is moved linearly toward and away from the wastegate port 14 by the actuator via the valve stem 220. In some embodiments, the valve 216 could be cam-operated or spring-loaded to linearly reciprocate at substantial right angles from the valve seat 226. When the valve 216 is in an open position (shown in broken lines in FIG. 8), the valve seat face 223 of the valve head 222 is spaced apart from the valve seat 226, and the valve seat face 223 remains parallel to the valve seat 226. When the valve 216 is in a closed position (shown in solid lines in FIG. 8), the valve seat face 223 of the valve head 222 is secured against the valve seat 226. The wastegate assembly 212 also includes a turbine housing having a contoured side wall 230 surrounding the wastegate port 214. In the turbine housing configuration shown in FIG. 8, the valve 216 the contoured side wall 230 defines a recess 236 that is elongated in the direction of valve movement. For example, the recess 236 has a depth that is at least twice the depth of the valve head margin 225, and preferably much greater than the depth of the valve head margin 225. In addition, the contoured side wall 230 shown as substantially linear while widening away from the valve seat 26, but the contoured side wall 230 would still be defined by the formula above where the side wall shape depends on the curtain area desired at a specific valve opening. The construction of the sidewall 230 would not substantially change relative to side wall 30 of the pivoting valve 16, except the reference point would move along a more linear path, instead of a widening arc of the concave portion 40. By providing the contoured side walls 230, the minimum flow area through the wastegate port 214 is controlled such that the flow is choked via the side walls 230 rather than the valve curtain area $A_{vc}$. The contoured side wall 230 can be recessed into the housing 210 as shown, or extend from the housing 210.

A wastegate assembly 212 including a contoured sidewall 230 can be compared to a conventional wastegate assembly 312 including poppet valve configuration in which a poppet valve 316 cooperates with a valve seat 326 that includes a lip defined by a shallow cylindrical recess 336 that surrounds the valve head 322 (FIG. 9). The shallow cylindrical recess 336 has a depth that generally corresponds to a depth of the valve head margin 325. In the case of a conventional poppet-valve wastegate assembly 312, when the valve 316 is in the closed position (shown in solid lines), the valve head 322 is secured against the valve seat 326, blocking flow through the wastegate port 314. Due to the shape and shallow depth of the recess 326, the ability to control the flow through the wastegate port 314 is limited once the valve 316 is moved to the open position (shown in broken lines).

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. An exhaust gas turbocharger including:
   a turbine housing (210) including a turbine volute adapted to guide exhaust gas flow to a turbine wheel housed in the turbine housing (210);
   a bypass channel formed in the turbine housing;
   a wastegate port (214) communicating between the turbine volute upstream of the turbine wheel and the bypass channel;
   a valve seat (226) positioned immediately around the wastegate port (214) and defined as a contact area between valve head (222) and wastegate port (214);
   a linear valve (216) having a valve stem (220) connected to a valve head (222), the valve head (222) dimensioned to seat on said valve seat (226), the linear valve (216) operable to move the valve head (222) between a seated position and an open position relative to the wastegate port (214) for selectively blocking and unblocking the wastegate port (214); and
   a side wall (230) including an extending wall portion formed by the bypass channel of the turbine housing (210) so as to surround the valve head (222) as the valve head (222) moves between the seated position and the open position;
   wherein the extending wall portion of the sidewall (230) forms a throat area (At) between the extending wall portion and valve head (222), the throat area (At) gradually increasing as the valve head (222) moves from the seated to the open position;
   wherein flow of exhaust gas through the bypass channel is controlled by the a throat area (At) between the extending wall portion of the sidewall (230) and valve head (222),
   wherein the sidewall (230) defines a recess (236) that is elongated in the direction of movement of the valve head (222), and
   wherein the throat area (At) between the extending wall portion and valve head (222) determines the flow area at any given valve opening to a greater extent than any gap between the valve seat (226) and the valve head (222).

2. The turbocharger of claim 1, wherein the valve head (222) is controllably moveable between positions closer to the valve seat (226) and positions further from the valve seat (226), and wherein the valve head is closer to the sidewall (230) at positions closer to the valve seat (226) and increasingly further from the sidewall (230) at positions further from the valve seat (226).

3. The turbocharger of claim 1 wherein the side wall (230) incorporates hole wells.

4. The turbocharger of claim 3 wherein the hole wells are channels that extend from the wastegate port.

5. The turbocharger of claim 1 wherein the sidewall (230) extends from the turbine housing (210) in the direction of movement of the valve head (222) and determines the flow area at a given valve opening.

6. The turbocharger of claim 1 wherein the linear valve (216) is spring loaded to linearly reciprocate.

7. An exhaust gas turbocharger including:
   a turbine housing (210) including a turbine volute adapted to guide exhaust gas flow to a turbine wheel housed in the turbine housing (210);
   a bypass channel formed in the turbine housing;
   a wastegate port (214) communicating between the turbine volute upstream of the turbine wheel and the bypass channel;
   a valve seat (226) immediately around the wastegate port (214);
   a linear valve (216) having a valve stem (220) connected to a valve head (222), the valve head (222) dimensioned to seat on said valve seat (226), the linear valve (216) operable to move the valve head (222) between a seated position and an open position relative to the wastegate port (214) for selectively blocking and unblocking the wastegate port (214); and
   a side wall (230) including an extending wall portion formed by the bypass channel of the turbine housing (210) so as to surround the valve head (222) as the valve head (222) moves between the seated position and the open position;
   wherein the extending wall portion of the sidewall (230) forms a throat area (At) between the extending wall portion and valve head (222), the throat area (At) gradually increasing as the valve head (222) moves from the seated to the open position;

wherein flow of exhaust gas through the bypass channel is controlled by the a throat area (At) between the extending wall portion of the sidewall (230) and valve head (222), wherein the sidewall (230) defines a recess (236) that is elongated in the direction of movement of the valve head (222) and determines the flow area at a given valve opening, and wherein the recess (236) has a depth that is at least twice the width of the valve head (222).

* * * * *